March 3, 1931. J. J. MOJONNIER 1,794,387
DISTRIBUTING SYSTEM
Filed March 21, 1927 3 Sheets-Sheet 1
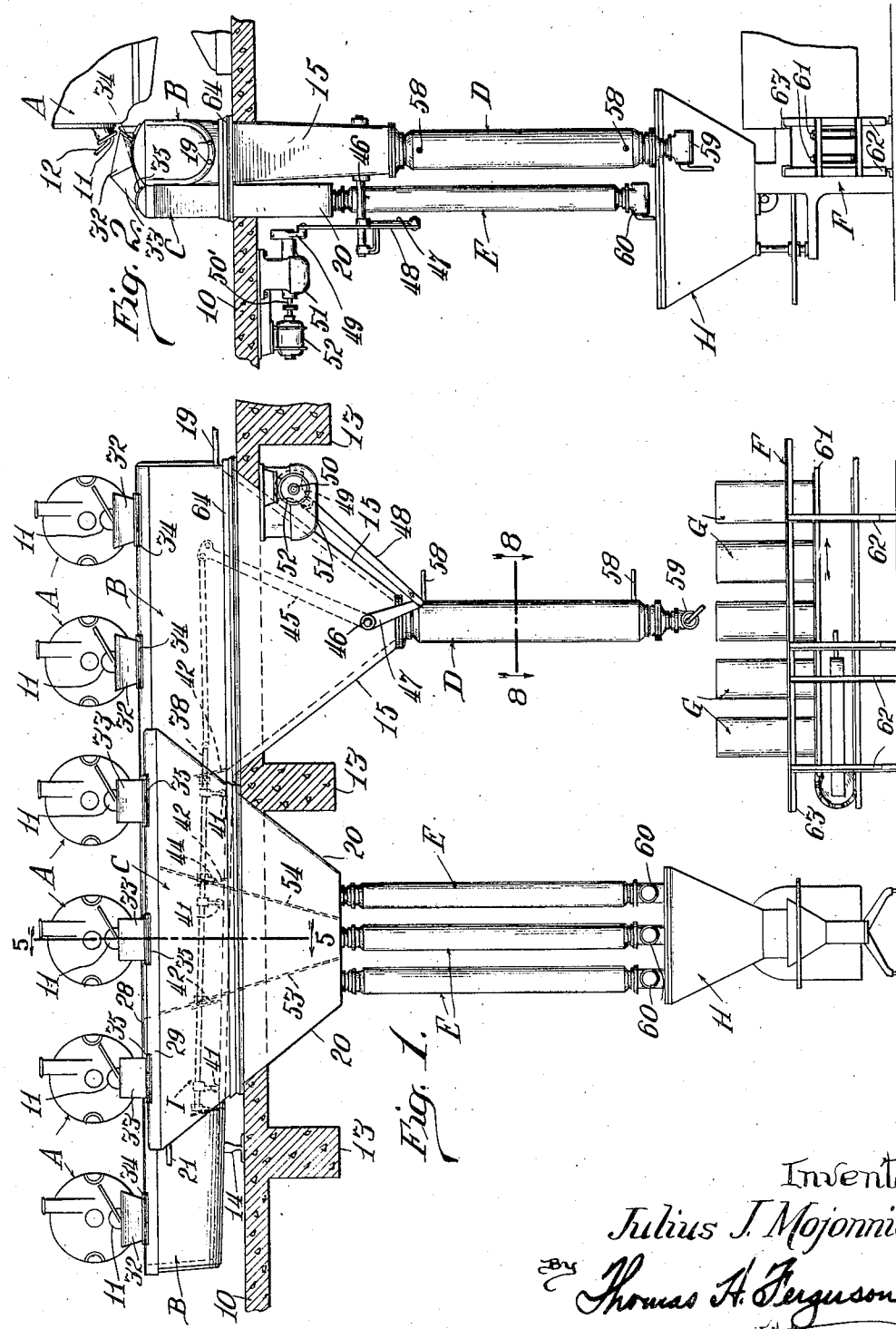
Inventor.
Julius J. Mojonnier
By Thomas H. Ferguson
Attorney.

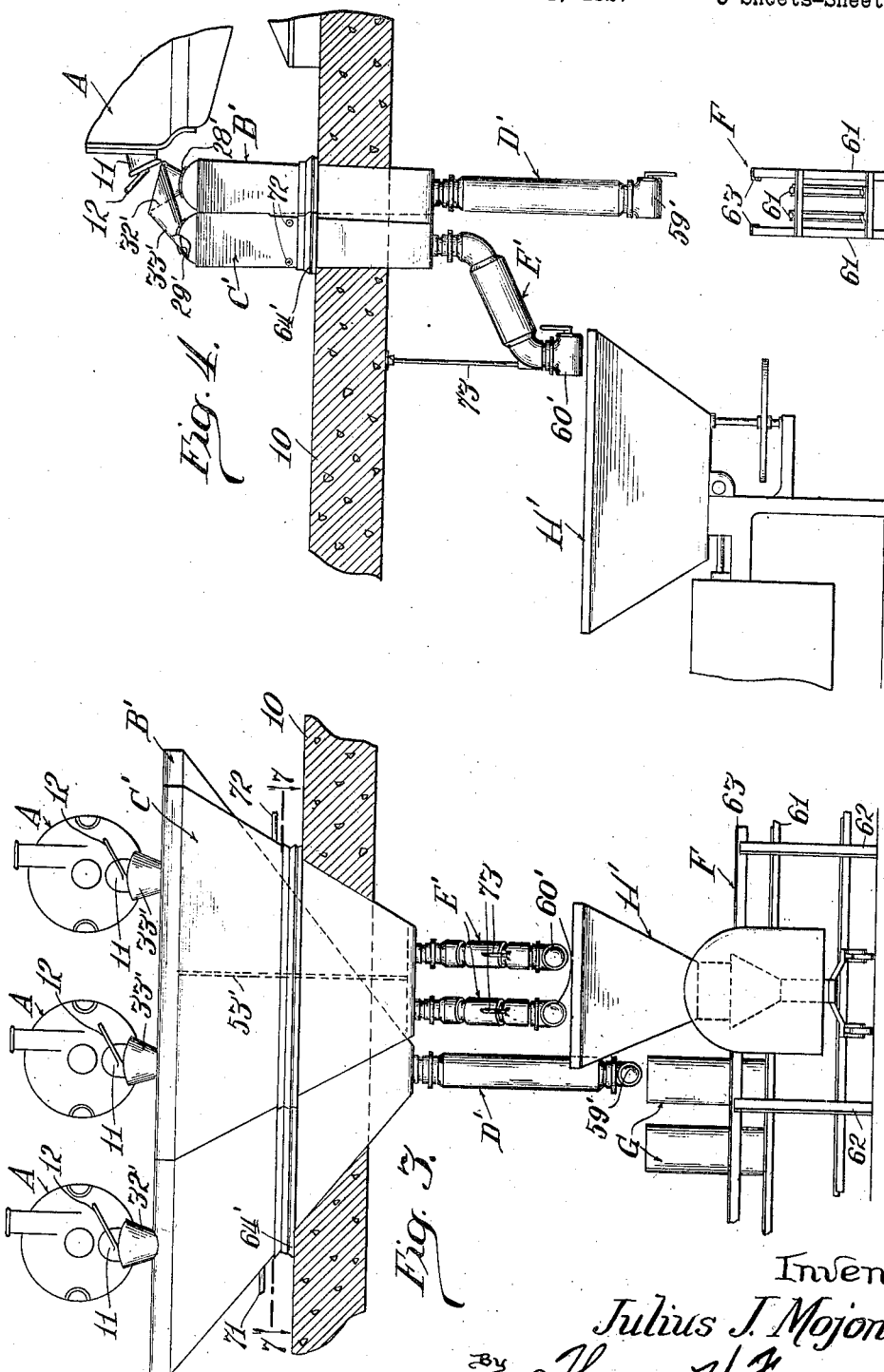

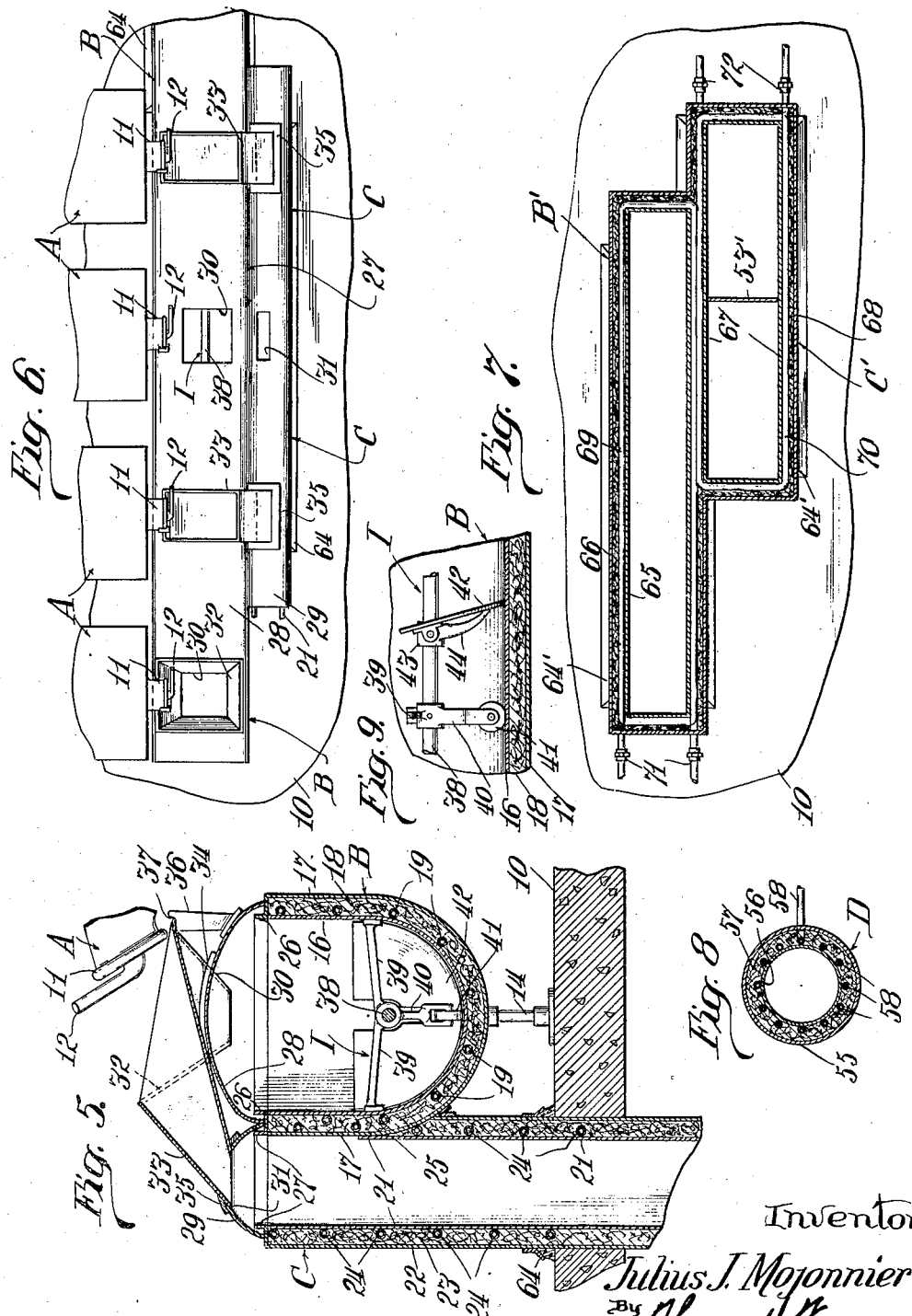

Patented Mar. 3, 1931

1,794,387

UNITED STATES PATENT OFFICE

JULIUS J. MOJONNIER, OF OAK PARK, ILLINOIS, ASSIGNOR TO MOJONNIER BROS. CO., A CORPORATION OF ILLINOIS

DISTRIBUTING SYSTEM

Application filed March 21, 1927. Serial No. 176,913.

The present invention relates to distributing systems generally, and more particularly to distributing systems wherein the material to be distributed is conveyed from points of production or supply to points of delivery by the action of gravity. Although the present invention may be variously embodied and in its uses may be employed for the handling of many kinds of materials, it has been developed particularly with reference to the handling of ice cream and other like viscous substances and will be illustrated and described in that connection, although, of course, I do not wish to have the invention itself unduly restricted because of that fact.

One object of the invention is to devise a distributing system which will improve the economy of operation of existing equipment. Thus where individual containers are used for supplying batches of a product or commodity, it is commonly important to have such containers working as nearly continuously as possible. If such containers be ice cream freezers, it is desirable to keep them at their usual and legitimate work of freezing as much of the time as possible. For this reason it is desirable, when the ice cream or other product is sufficiently frozen and is otherwise in condition for delivery, to empty it from the freezer quickly. To this end I provide in my distributing system hoppers of large capacity compared with the capacities of the freezers. It is thus possible to empty each freezer by quickly flowing its entire contents into the hopper. Furthermore, I provide an arrangement of hoppers such that they can be used interchangeably with the freezers and thus keep the freezers busy freezing batches during a maximum of time.

Another object is to simplify the conduit arrangement by which the product or commodity coming from the several sources is distributed. To this end I preferably employ a large common hopper to which all the sources have access. In the chosen embodiment where a battery of ice cream freezers is employed, the outlets of the several freezers are aligned and the main hopper extends beneath all of these outlets; furthermore, by making that hopper a single-compartment hopper and providing it with a single distributing conduit, I am able to produce an efficient system with very simple apparatus and a simple piping arrangement. Usually this results in improved economy in the original installation and in subsequent upkeep.

Another object is to render the whole plant more flexible than heretofore by using a plurality of hoppers and locating them so as to be available in each instance to several of the supplying sources, whether such sources be freezers or other devices. To this end I employ elongated hoppers and locate them close together side by side before the supply sources so that the commodity from at least several of the sources may be delivered at will into any hopper. I have found that an efficient and desirable system may be provided in the ice cream handling art by using two hoppers. But, of course, I do not wish to be limited to two; some installations may call for a greater number. By elongating the two hoppers they can be brought quite near the outlets of the freezers. Then a simple conduit in the form of a funnel serves to bridge the gap between the outlet of the freezer and the opening in the hopper, whichever hopper is to be used. Commonly the funnel or like conduit fits in an opening in each instance in the cover of the hopper. In ice cream practice, I commonly employ the first hopper in the handling of the regular bulk product, and the second hopper in the production of "specials" which are manufactured from time to time. In such case, the first hopper is a single-compartment hopper while the second hopper is a plural-compartment hopper having a compartment for each layer that is to be incorporated in the special product.

Another advantage resulting from the employing of my invention is great uniformity in the product. This is due to the fact that the hopper has large capacity compared with the capacities of the freezers or other batch producers. In the ice cream field the hopper usually has a capacity equal to at least one and one-half (1½) times the aggregate capacity of the freezers. In a large hopper of this kind, it is also preferable to employ a scraping and conveying device to carry the product to the outlet. This device also serves to mix the product coming from the several sources. Thus it will be seen that differences in the individual products of the several freezers will disappear and a uniform product will result by reason of the relatively large hopper capacity and the mixing of the batches from the different freezers.

Another object is to increase the capacity of the system by passing the materials through the system as rapidly as possible. This is particularly helped by the employment of relatively short conduits leading from the hoppers. Such rapidity of delivery assists in maintaining the palatability of the product by keeping it more nearly in the condition it is in upon leaving the freezers. The maintaining of this desirable condition is furthermore assisted by insulating and refrigerating the walls of the hopper or hoppers, and in some instances it may be desirable also to insulate and refrigerate the walls of one or more of the distributing conduits.

Having stated the general objects of the invention, reference should now be had to the following description and the accompanying drawings. From these a fuller and better understanding of the invention will be obtained, while the scope of the invention will be particularly pointed out in the appended claims.

In said drawings Fig. 1 is a side elevation of a distributing system constructed and arranged in accordance with the present invention, a portion of the floor by which the freezers and hoppers are supported being shown in section; Fig. 2 is an end elevation of the same system, the floor again being shown in section; Fig. 3 is a side elevation of another form of the invention employing somewhat smaller hoppers; Fig. 4 is an end elevation of this second form; Fig. 5 is a detailed sectional view of the hoppers of Fig. 1, the section being taken on a plane indicated by the line 5—5 of Fig. 1; Fig. 6 is a plan view of the hopper arrangement of Fig. 1; Fig. 7 is a similar view illustrating the hopper arrangement of Fig. 3, but in this instance the hoppers are shown in section, the plane of which is indicated by the line 7—7 of Fig. 3; Fig. 8 is a horizontal section through one of the distributing conduits which is insulated and refrigerated, the plane of section being indicated by the line 8—8 of Fig. 1; and Fig. 9 is a detail view illustrating particularly a scraper in the bottom of one of the hoppers, the hopper being shown in central vertical longitudinal section. Throughout these views like characters refer to like parts.

Referring to the drawings in detail and more particularly to those figures which illustrate the first form of the invention, A designates the freezers or other sources of the commodity to be distributed, B the larger or common hopper, C the smaller hopper, D the distributing conduit leading from the hopper B, E the distributing conduits leading from the hopper C, F a conveyor which carries cans or other containers G adapted to be filled from the conduit E, and H a package filling machine, the hopper of which is connected to the distributing conduits E.

As clearly shown, the containers A in the present embodiment are freezers arranged side by side upon a supporting floor 10 and the outlets 11 of these containers are aligned in position to deposit the freezer contents in each instance in the hopper B. Each outlet 11 is provided with a suitable controlling valve 12. The freezers A may be of any preferred construction since the same in themselves constitute no part of the present invention. The floor 10 on which the freezers are located is here shown as composed of concrete, having transverse beams 13 at suitable intervals.

The main hopper B is narrow and elongated and is of sufficient extent to receive from each of the freezers A. As viewed in Fig. 1, its left hand portion is relatively shallow and is supported by a standard 14 which rests upon the floor 10. The right hand portion on the other hand is made of considerable capacity by extending its walls downward through the floor 10, and its contents are guided to the outlet conduit D by having the end walls 15 converge downward. The hopper itself may be built up in different ways, but preferably I employ an inner wall 16 and an outer wall 17 of metal, preferably Monel metal. The space between these walls is provided with insulation 18, preferably hair, felt or ground cork. Of course, where the material to be handled by the system is not kept at a low or high temperature, it would not be necessary to employ this insulation. However, in the present instance, the embodiment being shown as applied to ice cream handling, such insulation is quite necessary. Furthermore, the inner wall 16 is perferably kept cold through the agency of refrigerating coils 19 which extend along against or near the plate 16 throughout the extent of the hopper. The coils 19 may be variously formed, but it is quite desirable to have them near the plate 16 rather than the plate 17.

The hopper C corresponds generally in shape to the right hand portion of the hopper B as the parts are viewed in Fig. 1; that is to say, its side walls are parallel and its end walls 20 are inclined, the same converging downward. As clearly shown in Fig. 5, the walls of the hopper C are composed of an inner plate 21 and an outer plate 22 with intervening insulation 23 and suitable refrigerating coils 24. All these are similar to the corresponding parts of the hopper B. As shown in the same figure, the wall of the hopper C, which lies adjacent to the hopper B, is terminated at the point 25 and only the inner plate 21 of the hopper C extends up along the outer plate 17 of the hopper B as there shown. The hopper C and the right hand portion of the hopper B extend down through openings in the floor 10 so that portions of each hopper extend above the floor and other portions extend below it. Protecting and finishing strips 64 of metal are secured to the hopper walls just above the floor level and make a neat joint with the floor providing thereby a sanitary and neat finish.

Each of the hoppers B and C is provided at its upper edge with a flange, designated 26 in the one case and 27 in the other. These flanges are practically continuations of the inner plates 16 and 21, respectively. Cooperating with these flanges are two covers 28 and 29, the former for the hopper B and the latter for the hopper C. These covers are arcuate in cross section and fit fairly snugly over the flanges 26 and 27. These covers extend from end to end of the hoppers and are provided with openings which lie directly in front of the freezers or other sources of supply. The openings in the cover 28 of hopper B are designated 30 and those in the cover 29 of hopper C are designated 31. The arrangement of these openings is shown in plan in Fig. 6. It is through these openings that the material coming from the containers A is passed into the hoppers. To guide it in its passage I preferably employ funnels 32 for the openings 30 and funnels 33 for the openings 31. Each funnel 32 is provided with a collar 34 which extends around its outer surface and bears against the top of the cover 28 when the funnel is in position. In like manner each funnel 33 is provided with a collar 35 which similarly cooperates with the cover 29 of the hopper C. In order to assist in supporting the edges of the funnels 32 and 33 which lie adjacent to the container A in each instance. I provide a standard 36 which is suitably supported on the top of the cover 28 at a point to the right of the openings, as the parts are viewed in Fig. 5. The upper end of the standard 36 is provided with a notch 37 to receive a lip or rim upon the adjacent edge of the funnel. The funnels 32 and 33 may be of any outline in horizontal section, but are here shown as rectangular. It will be understood that in the case of each freezer a funnel 32 will be used when the container contents are to be dumped into hopper B, and that a funnel 33 will be used when those contents are to be deposited in hopper C. When the funnel 32 is in use, the funnel 33 is removed, leaving the opening 31 of the cover 29 uncovered. In like manner, when the funnel 33 is in use, the funnel 32 is removed, leaving the opening 30 of cover 28 uncovered. The openings 30 and 31, of course, are such in outline as to fit the rectangular outline of the funnels.

Because of the length of the hopper B, a scraping mechanism I is preferably employed to draw the contents from the shallow end of the hopper to the deep end. This mechanism may be variously constructed and still perform its proper functions. As illustrative of a suitable arrangement for this purpose, I may call attention to United States Patent No. 1,476,996, granted December 11, 1923, for an agitator. The patented structure may be readily adapted to meet the requirements of the hopper B in the present case. The mechanism herein disclosed comprises a shaft 38 which extends lengthwise of the hopper and is held spaced from its inner walls by arms 39 and 40, positioned at suitable intervals. The latter carry anti-friction rollers 41 which travel along the bottom of the adjacent portion of the hopper. The arms 39 are preferably laterally extended and do not require antifriction rollers, but they themselves slide along the side walls of the hopper. The shaft 38 also carries scraper members 42 which engage the inner surface of the hopper during an advancing movement and rock out of such engagement upon a return movement. The scrapers 42 are pivotally mounted in each case upon a frame 43 which is fixed to the shaft 38 and carries a downwardly projecting stop arm 44. The scraper 42 in each instance bears against the stop arm 44 during the advancing movement of the scraper and rocks out of engagement with it upon the return movement. The shaft 38 is mounted for reciprocation, and for this purpose is connected at its forward end to the upper end of a rock arm 45 which is mounted on a transverse shaft 46 near the bottom of the tapering portion of the hopper B. The arm 45 is located within the hopper, while the shaft 46 extends through its side walls and is available for connection outside of the hopper. At the latter point a rock arm 47 is connected and the outer end of this arm is connected to a link 48 connected at its opposite end to a crank arm 49 carried by shaft 50 journaled in a casing 51 in which is located a train of gearing driven by a shaft $50^1$ which is coupled to the shaft of an electric motor 52 suitably secured like the gear casing upon the under side of the floor 10. It will be seen that as the motor is driven the arm 49 will be rotated and the connections will result in reciprocating the shaft 38 to cause the scrapers 42 to draw material along the hopper during their forward movement and during their return movement to slip through the same without conveying it. It is obvious that where the hopper is not provided with such a shallow portion as is the hopper B, such scraping device may be dispensed with.

The hopper C is in the present instance available to the second, third and fourth freezers or other supply sources, counting from the left as the parts are viewed in Fig. 1. Obviously, this arrangement might be changed to make other freezers available to this hopper. With the arrangement shown, all freezers may be operated to furnish one and the same product to the hopper B. When "specials" are to be made then the first, fifth and sixth freezers operate as before to furnish the common product to the hopper B while the second, third and fourth freezers are used to manufacture the special, each of the latter freezers furnishing a different flavor and these being deposited in the compartments of the hopper C. Since there are three freezers available to the hopper C, the latter is divided into three compartments by partitions 53 and 54. These converge downwardly and thus render each compartment available to one of the aforesaid freezers. Likewise, each compartment is in open communication at is lower end with the interior of its distributing tube E.

The distributing conduits D and E are tubular in form and preferably provided in each instance with inner and outer walls having insulating material between them. In some cases it may be also desirable to refrigerate the conduits. As illustrative of this construction I have shown in Fig. 8 a cross section of the conduit D which is both insulated and refrigerated. This conduit has an outer wall 55 and an inner wall 56, intervening insulation 57 and refrigerating coils 58. Obviously, the insulating material may be varied and other materials used besides those heretofore suggested. Similarly, the walls of the conduit may be composed of other material than metal and other metal than Monel metal previously suggested. Likewise, the coils 58 in the walls of the conduit D may be variously positioned, but it is desirable for efficiency to have the same contact or practically contact with the inner wall 56. The conduit D is connected at its upper end to the lower end of the deep portion of the hopper B. The lower end of the conduit D is provided in the present instance with a valve 59. The conduits E may be of the same construction as the conduit D or the refrigerating coils may be omitted. In the embodiment illustrated in Fig. 1, the conduits E are connected to the bottoms of the compartments of hopper C and are provided at their lower ends with valves 60.

As previously mentioned, the lower ends of the conduits D and E may deliver the material at various points and to different kinds of apparatus. In the particular embodiment illustrated, the conduit D is positioned so as to deliver through its valve 59 ice cream or other semi-frozen commodity to cans G. These are ordinarily of considerable size, commonly holding 3, 5 or 10 gallons each. These cans are placed upon the conveyor chain 61 of the conveyor F and are advanced by the latter in the direction of the arrow shown adjacent thereto in Fig. 1. The conveyor F includes also legs 62 and side frames 63 which hold the cans in position upon the upper stretch of the conveying chain 61. This chain may be driven in any suitable way. The details of the conveyor F are set forth at length in my application Serial No. 109,728 filed May 17, 1926, Patent No. 1,714,721, granted May 28, 1929. The cans G are positioned one after the other beneath the valve 59 and the latter is manipulated to allow the commodity to fall into the cans, each can being carried along after it has been filled. In the case of the conduits E the commodity is distributed through the valves 60 to a packaging machine H. As previously indicated, the three compartments of the hopper C will be furnished with partially frozen cream or ices of different flavors, and these will be conveyed through the conduits E to the compartments in the hopper of the packaging machine H. The latter will then supply three layers to each of the containers presented to the machine. This machine of itself constitutes no part of the present invention and therefore need not be described in detail. It will suffice to call attention to the patent of a packaging machine suitable for this purpose. Such a patent is Patent No. 1,502,314 granted July 22, 1924.

Referring now to the second embodiment of the invention, namely, that illustrated in Figs. 3, 4 and 7, we have again the same containers A mounted upon the same floor 10 and having their openings 11 in alignment, and each opening under the control of a valve 12. But in this instance the number of containers is less than in the previously described embodiment. Here three ice cream freezers are shown and all three have access to the long hopper $B^1$, whereas only the second and third freezers, counting from the left in Fig. 3, have access to the hopper $C^1$. In this instance the hopper $B^1$ is a one compartment hopper, while the hopper $C^1$ is a two compartment hopper, the partition $53^1$ dividing the compartments. Here again funnels $32^1$ and $33^1$ similar to the funnels 32 and 33 respectively are employed in conjunction with covers $28^1$ and $29^1$. The funnels $32^1$ and $33^1$ and the corresponding openings $28^1$ and $29^1$ are circular in outline, instead of rectangular as are the corresponding parts in the embodiment of Fig. 1. In this instance the hoppers both extend down through the openings in the floor 10 and are supported by it. Here too, the outer walls of the two hoppers are provided with strips $64^1$ for covering up any spaces around the hopper and between it and the floor. The construction of the walls of these hoppers is the same as heretofore described except that where the hoppers come together the construction is somewhat different as illustrated in Fig. 7. There the inner and outer walls 65 and 66 of hopper B¹ and the inner and outer walls 67 and 68 of hopper C¹ are joined together as illustrated. In this instance each hopper is provided with refrigerating coils, the coils 69 being provided for the hopper B¹ and the coils 70 for the hopper C¹. Suitable connections 71 and 72 enable these coils to be supplied with refrigerant from a suitable source. In this case the large hopper B¹ supplies the product through the conduits D¹ and valves 59¹ to cans G upon a conveyor F, the same as in the case of the corresponding parts in the embodiment of Fig. 1. Here too, the hopper C¹ supplies the commodity through conduits E¹ and valves 60¹ to a packaging machine H¹ of similar construction to the packaging machine H, but intended in this instance for supplying a brick having two flavors instead of three. In this case the valves 60¹ and the adjacent structure are in part supported by a tension rod 73 connected at one end to the valves and at the other end to the floor 10.

It will be obvious that if the present invention be embodied in a structure where warm or hot substances are to be conveyed from supply sources to delivery points, then the coils about the hoppers and the pipes or any of them will be supplied with a heating fluid. Again if the temperature be not important then the insulation and coils may be entirely omitted from the structure.

It will also be obvious that the present invention may be applied to various hopper arrangements according to the requirements of any given case. It will not always be the case that the hoppers will supply a partially frozen commodity, nor will it always be the case that when such commodity is supplied, it will be supplied to a can filling position or to a packaging machine. In some instances the semi-frozen commodity may be supplied to a pan filling position where the pans serve as molds for slabs from which bricks are subsequently cut, as illustrated, for example, in Reissue Patent No. 14,887 granted June 22, 1920, to Dalton. In other instances the semi-frozen product may be distributed from the larger bulk hopper to a can filling machine which will step the cans along and fill them successively without manual effort. Such a machine is disclosed in Mojonnier and Phillips application Serial No. 142,225 filed October 18, 1926.

From what has been set forth, it will be seen that my invention is capable of varied application and embodiment. I, therefore, do not wish to be limited to the exact uses and constructions illustrated and described, but aim to cover by the terms of the appended claims all such alterations and modifications as rightly come within the spirit and scope of my invention.

What I claim as new and desire to secure by a Patent of the United States is:

1. The combination with supply means having a series of horizontally aligned outlets for delivering the substance to be distributed, of a plurality of elongated hoppers lying forward of and slightly below said outlets to receive the substance therefrom, said hoppers extending before said outlets in planes substantially vertical and substantially parallel to each other and to the line of said outlets, covers for said hoppers each having an opening therein opposite each of said outlets, short and long bridging conduits for directing the substance received from said outlets through the cover openings into said hoppers respectively, the short conduit bridging the gap between an outlet and the nearest opening in the nearest cover and the long conduit in like manner reaching from the outlet to the nearest opening in the farthest cover, and distributing conduits leading downward from the bottoms of said hoppers to suitable delivery points.

2. The combination with a series of supply containers operative to furnish in batches the material to be distributed, each container having an outlet and the outlets of said containers being horizontally aligned, of a plurality of elongated hoppers lying forward of and slightly below said outlets to receive batches from said containers, said hoppers extending before said outlets in planes substantially vertical and substantially parallel to each other and to the line of said outlets, covers for said hoppers each having an opening therein opposite each of said outlets, short and long bridging conduits for directing the substance received from said outlets through the cover openings into said hoppers respectively, the short conduit bridging the gap between an outlet and the nearest opening in the nearest cover and the long conduit in like manner reaching from the outlet to the nearest opening in the farthest cover, and distributing conduits leading downward from the bottoms of said hoppers to suitable delivery points.

3. The combination with a series of freezers having their outlets aligned horizontally and a floor on which said freezers are located, of a plurality of elongated hoppers lying forward of and slightly below said outlets to receive the contents of said freezers, said hoppers passing through said floor and extending in closely adjacent planes substantially vertical and substantially parallel to each other and to the line of the freezer outlets, covers for said hoppers each having an opening therein opposite each of said outlets, short and long bridging conduits for directing the substance received from said outlets through the cover openings into said hoppers respectively, the short conduit bridging the gap between an outlet and the nearest opening in the nearest cover and the long conduit in like manner reaching from the outlet to the nearest opening in the farthest cover, and distributing conduits leading downward from the bottoms of said hoppers to suitable delivery points.

4. The combination with a series of freezers having their outlets aligned horizontally and a floor on which said freezers are located, of an elongated single-compartment hopper positioned forward of and slightly below said outlets to receive the contents of said freezers, an elongated plural-compartment hopper positioned just forward of said single-compartment hopper with its top at substantially the same level as the top of the latter, said hoppers passing through said floor and extending in closely adjacent planes substantially vertical and substantially parallel to each other and to the line of the freezer outlets, covers for said hoppers, short bridging conduits for connecting said outlets to openings in said covers to direct the freezer contents from said outlets into said hoppers, there being one opening in each cover for each outlet and the openings before each outlet being in a line with it, said line being transverse to the line of said aligned outlets, a distributing conduit leading from the bottom of said single-compartment hopper downward to a delivery point, and additional distributing conduits leading, one from the bottom of each compartment of said plural-compartment hopper, downward to other delivery points.

5. The combination with a series of freezers having their discharge outlets aligned horizontally, of an elongated single-compartment hopper positioned forward of and slightly below said outlets, an elongated plural-compartment hopper positioned alongside said single-compartment hopper, said hoppers having their tops at substantially the same level and their depending bodies positioned in closely adjacent planes substantially vertical and substantially parallel to each other and to the line of said aligned outlets, covers for said hoppers having openings therein opposite said outlets, the openings before each outlet being in a line transverse to the line of said outlets, short and long bridging conduits for directing the freezer contents from said outlets through the cover openings into said hoppers, the short conduit bridging the gap between an outlet and the nearest opening in the nearest cover and the long conduit reaching from an outlet to the nearest opening in the farthest cover, a distributing conduit leading downward from the bottom of said single-compartment hopper to a delivery point, and additional distributing conduits leading downward, one from the bottom of each compartment of said plural-compartment hopper, to other delivery points.

6. The combination with a plurality of supply containers having horizontally aligned outlets, of two relatively narrow and long hoppers having their bottoms provided with discharge openings and their tops positioned at a level slightly below that of said outlets and their depending bodies positioned in closely adjacent planes substantially vertical and substantially parallel to each other and to the line of said outlets, covers for said hoppers each having receiving openings opposite each of said containers in line with its outlet, said line extending transversely of the line of said outlets, and short and long conduit means for bridging the short and long gaps between an outlet and the near and far openings to guide the container contents to the near and far hoppers respectively.

7. The combination with a plurality of freezers having their outlets horizontally aligned, of two relatively narrow and long hoppers having their bottoms provided with discharge openings and their tops positioned at a level slightly below that of said outlets and their depending bodies positioned in closely adjacent planes substantially vertical and substantially parallel to each other and to the line of said outlets, one of said hoppers having a volumetric capacity in excess of the other and in excess of the aggregate capacities of all the freezers having access to it, short and long conduit means for bridging the short and long gaps between said outlets and said near and far hoppers respectively to guide the freezer contents thereto, and means in said large hopper for conveying the batches from the different freezers to the discharge opening of the hopper.

8. The combination with a plurality of ice cream freezers, of a hopper positioned to receive the contents of said freezers when drawn, said hopper having a capacity in excess of the aggregate capacity of said freezers, a distributing conduit leading from an outlet opening in said hopper downward to a delivery point below the level of the bottom of said hopper, and means for refrigerating said hopper to maintain the contents therein in proper condition.

9. The combination with a plurality of ice cream freezers, of a double walled hopper positioned to receive the contents of said freezers when drawn, said hopper having a capacity in excess of the aggregate capacity of said freezers, a distributing conduit leading from an outlet opening in said hopper downward to a delivery point below the level of the bottom of said hopper, means for refrigerating the inner walls of said hopper to maintain the contents therein in proper condition, and means for insulating the outer walls of said hopper from said inner walls and from said refrigerating means.

10. The combination with a plurality of ice cream freezers, of a hopper positioned to receive the contents of said freezers when drawn, said hopper having a capacity in excess of the aggregate capacity of said freezers, a distributing conduit leading from an outlet opening in said hopper downward to a delivery point below the level of the bottom of said hopper, and means for refrigerating said hopper and conduit to maintain the contents therein in proper condition.

11. The combination with a plurality of ice cream freezers, of a double walled hopper positioned to receive the contents of said freezers when drawn, said hopper having a capacity in excess of the aggregate capacity of said freezers, a doubled walled distributing conduit leading from an outlet opening in said hopper downward to a delivery point below the level of the bottom of said hopper, means for refrigerating the inner walls of said hopper and conduit to maintain the contents therein in proper condition, and means for insulating the outer walls of said hopper and conduit from said inner walls and from said refrigerating means.

12. The combination with a plurality of ice cream freezers, of a covered hopper having suitable openings through which the freezers are adapted to discharge their contents into said hopper, said hopper having a capacity in excess of the aggregate capacity of said freezers, a distributing conduit leading from an outlet opening in said hopper downward to a delivery point below the level of the bottom of said hopper, and means for refrigerating said hopper to maintain the contents therein in proper condition.

13. The combination with a plurality of ice cream freezers, of a covered double walled hopper having suitable openings through which the freezers are adapted to discharge their contents into said hopper, said hopper having a capacity in excess of the aggregate capacity of said freezers, a distributing conduit leading from an outlet opening in said hopper downward to a delivery point below the level of the bottom of said hopper, means for refrigerating the inner walls of said hopper to maintain the contents therein in proper condition, and means for insulating the outer walls of said hopper from said inner walls and from said refrigerating means.

14. The combination with a plurality of ice cream freezers, of a covered hopper having suitable openings through which the freezers are adapted to discharge their contents into said hopper, said hopper having a capacity in excess of the aggregate capacity of said freezers, a distributing conduit leading from an outlet opening in said hopper downward to a delivery point below the level of the bottom of said hopper, and means for refrigerating said hopper and conduit to maintain the contents therein in proper condition.

15. The combination with a plurality of ice cream freezers, of a covered double walled hopper having suitable openings through which the freezers are adapted to discharge their contents into said hopper, said hopper having a capacity in excess of the aggregate capacity of said freezers, a double walled distributing conduit leading from an outlet opening in said hopper downward to a delivery point below the level of the bottom of said hopper, means for refrigerating the inner walls of said hopper and conduit to maintain the contents therein in proper condition, and means for insulating the outer walls of said hopper and conduit from said inner walls and from said refrigerating means.

16. The combination with a plurality of ice cream freezers of the batch type, of a hopper positioned before and below the level of the discharge openings of said freezers in position to receive the contents of said freezers when discharged through said openings, said hopper having a capacity in excess of the aggregate capacity of said freezers, a cover for said hopper having openings aligned with said freezer discharge openings, through which cover openings the contents of said freezers pass into said hopper, a distributing conduit leading from an outlet opening in said hopper downward to a delivery point below the level of the bottom of said hopper, and means for refrigerating said hopper to maintain the contents therein in proper condition.

17. The combination with a plurality of ice cream freezers of the batch type, of a double walled hopper positioned before and below the level of the discharge openings of said freezers in position to receive the contents of said freezers when discharged through said openings, said hopper having a capacity in excess of the aggregate capacity of said freezers, a cover for said hopper having openings aligned with said freezer discharge openings, through which cover openings the contents of said freezers pass into said hopper, a distributing conduit leading from an outlet opening in said hopper downward to a delivery point below the level of the bottom of said hopper, means for refrigerating the inner walls of said hopper to maintain the contents therein in proper condition, and means for insulating the outer walls of said hopper from said inner walls and from said refrigerating means.

18. The combination with a plurality of ice cream freezers of the batch type, of a hopper positioned before and below the level of the discharge openings of said freezers in position to receive the contents of said freezers when discharged through said openings, said hopper having a capacity in excess of the aggregate capacity of said freezers, a cover for said hopper having openings aligned with said freezer discharge openings, through which cover openings the contents of said freezers pass into said hopper, a distributing conduit leading from an outlet opening in said hopper downward to a delivery point below the level of the bottom of said hopper, and means for refrigerating said hopper and conduit to maintain the contents therein in proper condition.

19. The combination with a plurality of ice cream freezers of the batch type, of a double walled hopper positioned before and below the level of the discharge openings of said freezers in position to receive the contents of said freezers when discharged through said openings, said hopper having a capacity in excess of the aggregate capacity of said freezers, a cover for said hopper having openings aligned with said freezer discharge openings, through which cover openings the contents of said freezers pass into said hopper, a double walled distributing conduit leading from an outlet opening in said hopper downward to a delivery point below the level of the bottom of said hopper, means for refrigerating the inner walls of said hopper and conduit to maintain the contents therein in proper condition, and means for insulating the outer walls of said hopper and conduit from said inner walls and from said refrigerating means.

20. The combination with a plurality of ice cream freezers, of a hopper positioned to receive the contents of said freezers when drawn, said hopper having a capacity in excess of the aggregate capacity of said freezers, a distributing conduit leading from an outlet opening in said hopper downward to a delivery point below the level of said hopper, means in said hopper for conveying the contents of said hopper over the hopper bottom to said outlet opening, and means for refrigerating said hopper to maintain the contents therein in proper condition.

21. The combination with a plurality of ice cream freezers, of a hopper positioned to receive the contents of said freezers when drawn, said hopper having a capacity in excess of the aggregate capacity of said freezers, a distributing conduit leading from an outlet opening in said hopper downward to a delivery point below the level of said hopper, means in said hopper for conveying the contents of said hopper over the hopper bottom to said outlet opening, and means for refrigerating said hopper and conduit to maintain the contents therein in proper condition.

22. The combination with a plurality of ice cream freezers, of a covered hopper having suitable openings through which the freezers may discharge their contents into said hopper, said hopper having a capacity in excess of the aggregate capacity of said freezers, a distributing conduit leading from an outlet opening in said hopper downward to a delivery point below the level of the bottom of said hopper, means in said hopper for conveying the contents of said hopper over the hopper bottom to said outlet opening, and means for refrigerating said hopper to maintain the contents therein in proper condition.

23. The combination with a plurality of ice cream freezers, of a covered hopper having suitable openings through which the freezers may discharge their contents into said hopper, said hopper having a capacity in excess of the aggregate capacity of said freezers, a distributing conduit leading from an outlet opening in said hopper downward to a delivery point below the level of the bottom of said hopper, means in said hopper for conveying the contents of said hopper over the hopper bottom to said outlet opening, and means for refrigerating said hopper and conduit to maintain the contents therein in proper condition.

24. The combination with a plurality of ice cream freezers of the batch type, of a hopper positioned before and below the level of the discharge openings of said freezers in position to receive the contents of said freezers when discharged through said openings, said hopper having a capacity in excess of the aggregate capacity of said freezers, a cover for said hopper having openings aligned with said freezer discharge openings, through which cover openings the contents of said freezers pass into said hopper, a distributing conduit leading from an outlet opening in said hopper downward to a delivery point below the level of the bottom of said hopper, means in said hopper for conveying the contents of said hopper over the hopper bottom to said outlet opening, and means for refrigerating said hopper to maintain the contents therein in proper condition.

25. The combination with a plurality of ice cream freezers of the batch type, of a hopper positioned before and below the level of the discharge openings of said freezers in position to receive the contents of said freezers when discharged through said openings, said hopper having a capacity in excess of the aggregate capacity of said freezers, a cover for said hopper having openings aligned with said freezer discharge openings, through which cover openings the contents of said freezers pass into said hopper, a distributing conduit leading from an outlet opening in said hopper downward to a delivery point below the level of the bottom of said hopper, means in said hopper for conveying the contents of said hopper over the hopper bottom to said outlet opening, and means for refrigerating said hopper and conduit to maintain the contents therein in proper condition.

26. The combination with a plurality of ice cream freezers of the batch type, of a double walled hopper positioned before and below the level of the discharge openings of said freezers in position to receive the contents of said freezers when discharged through said openings, said hopper having a capacity in excess of the aggregate capacity of said freezers, a cover for said hopper having openings aligned with said freezer discharge openings, through which cover openings the contents of said freezers pass into said hopper, a double walled distributing conduit leading from an outlet opening in said hopper downward to a delivery point below the level of the bottom of said hopper, means in said hopper for conveying the contents of said hopper over the hopper bottom to said outlet opening, means for refrigerating the inner walls of said hopper and conduit to maintain the contents therein in proper condition, and means for insulating the outer walls of said hopper and conduit from said inner walls and from said refrigerating means.

In witness whereof, I hereunto subscribe my name this 18th day of March, A. D. 1927.

JULIUS J. MOJONNIER.